US012002370B2

(12) United States Patent
Kim et al.

(10) Patent No.: US 12,002,370 B2
(45) Date of Patent: Jun. 4, 2024

(54) METHOD FOR GUIDING AN EMERGENCY VEHICLE USING AN UNMANNED AERIAL VEHICLE

(71) Applicant: INTERNATIONAL BUSINESS MACHINES CORPORATION, Armonk, NY (US)

(72) Inventors: Minkyong Kim, Yorktown Heights, NY (US); Clifford A. Pickover, Yorktown Heights, NY (US); Valentina Salapura, Yorktown Heights, NY (US); Maja Vukovic, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 16/750,494

(22) Filed: Jan. 23, 2020

(65) Prior Publication Data

US 2020/0160735 A1 May 21, 2020

Related U.S. Application Data

(62) Division of application No. 15/266,509, filed on Sep. 15, 2016, now Pat. No. 10,600,326.

(51) Int. Cl.
*G08G 1/087* (2006.01)
*G08G 1/00* (2006.01)
(Continued)

(52) U.S. Cl.
CPC ............. *G08G 5/0069* (2013.01); *G08G 1/04* (2013.01); *G08G 1/087* (2013.01); *G08G 1/0965* (2013.01);
(Continued)

(58) Field of Classification Search
CPC .................................................... G08G 5/0069
See application file for complete search history.

(56) References Cited

U.S. PATENT DOCUMENTS 5,710,555 A 1/1998 McConnell
8,466,805 B2 6/2013 Waymire
(Continued)

FOREIGN PATENT DOCUMENTS

WO 2015196081 12/2015

OTHER PUBLICATIONS

Sep. 15, 2016, U.S. Appl. No. 15/266,509, U.S. Pat. No. 10,600,326.
(Continued)

*Primary Examiner* — Imran K Mustafa
(74) *Attorney, Agent, or Firm* — Daniel J Blabolil

(57) ABSTRACT

A method for guiding an emergency vehicle to an emergency site includes receiving an emergency dispatch message including a location of an emergency. Present location information is received for an emergency vehicle. A route between the received present location and the received location of the emergency is calculated using area map data. Navigation guidance is provided to the emergency vehicle based on the calculated route. The calculated route and the present location information for the emergency vehicle are transmitted to an unmanned aerial vehicle (UAV). The UAV is automatically piloted ahead of the emergency vehicle, along the calculated route, using the calculated route and present location transmitted thereto. A traffic alert is transmitted from the UAV to influence traffic flow ahead of the emergency vehicle.

8 Claims, 6 Drawing Sheets

(51) Int. Cl.

| | |
|---|---|
| ***G08G 1/04*** | (2006.01) |
| ***G08G 1/0965*** | (2006.01) |
| ***G08G 1/0968*** | (2006.01) |
| ***G08G 5/00*** | (2006.01) |

(52) U.S. Cl.

CPC . *G08G 1/096827* (2013.01); *G08G 1/096844* (2013.01); *G08G 1/205* (2013.01); *G08G 5/0013* (2013.01); *G08G 5/0026* (2013.01); *G08G 5/0034* (2013.01); *G08G 5/0056* (2013.01)

(56) References Cited

U.S. PATENT DOCUMENTS

| | | | | |
|---|---|---|---|---|
| 8,983,682 | B1 | 3/2015 | Peeters et al. | |
| 9,051,043 | B1 | 6/2015 | Peeters | |
| 9,158,304 | B2 | 10/2015 | Fleck | |
| 9,387,928 | B1 * | 7/2016 | Gentry | B60L 53/00 |
| 10,600,326 | B2 | 3/2020 | Kim | |
| 2002/0089416 | A1 | 7/2002 | Dornfeld | |
| 2006/0184319 | A1 | 8/2006 | Seick et al. | |
| 2007/0135989 | A1 | 6/2007 | Hengst | |
| 2011/0193722 | A1 | 8/2011 | Johnson | |
| 2013/0287261 | A1 * | 10/2013 | Lee | G08G 1/08 382/104 |
| 2014/0032089 | A1 | 1/2014 | Aoude et al. | |
| 2015/0106010 | A1 * | 4/2015 | Martin | G08G 1/0133 701/410 |
| 2015/0334545 | A1 | 11/2015 | Maier et al. | |
| 2015/0370251 | A1 * | 12/2015 | Siegel | G05D 1/0684 701/2 |
| 2016/0001884 | A1 | 1/2016 | Fleck | |
| 2016/0093213 | A1 | 3/2016 | Rider et al. | |
| 2017/0053169 | A1 * | 2/2017 | Cuban | G05D 1/104 |
| 2017/0139421 | A1 * | 5/2017 | Lockwood | G05D 1/0202 |
| 2017/0301234 | A1 | 10/2017 | Park | |
| 2017/0358222 | A1 | 12/2017 | Schubert | |
| 2018/0075759 | A1 | 3/2018 | Kim | |

OTHER PUBLICATIONS

Howard, et al., "Acoustic characteristics for effective ambulance sirens," Acoustics Australia [journal], Aug. 2011. pp. 43-53, vol. 39, No. 2, Retrieved from the Internet: <URL: http://www.acoustics.asn.au/journal/2011/2011_39_2_Howard.pdf>.

Anonymous Inventors; Ttl: Method and System for Intelligently Providing Navigation Assistance in a Campus during Emergency; Sep. 16, 2015; Database: ip.com; ip.com No. IPCOM000243127D.

Chenhao Tan, Jie Tang, Jimeng Sun, Quan Lin, and Fengjiao Wang. 2010. Social action tracking via noise tolerant time-varying factor graphs. In Proceedings of the 16th ACM SIGKDD international conference on Knowledge discovery and data mining (KDD '10). ACM, New York, NY, USA, 1049-1058, DOI=http://dx.doi.org/10.1145/1835804.1835936.

B. Yang, J. Sun, T. Wang, Z. Chen, Effective Multi-Label Active Leaming for Text Classification, Knowledge Discovery and Data Mining (KDD), 2009.

* cited by examiner

METHOD FOR GUIDING AN EMERGENCY VEHICLE USING AN UNMANNED AERIAL VEHICLE

CROSS-REFERENCE TO RELATED APPLICATION

This divisional U.S. patent application claims priority under 35 U.S.C. § 121 to U.S. patent application Ser. No. 15/266,509, filed on Sep. 15, 2016 in the United States Patent and Trademark Office, the disclosure of which is incorporated by reference herein in its entirety.

TECHNICAL FIELD

The present invention relates to a method for guiding an emergency vehicle, and more specifically, to a method for guiding an emergency vehicle using an unmanned aerial vehicle (UAV).

DISCUSSION OF THE RELATED ART

Emergency vehicles need to get to an emergency site quickly. An emergency dispatch message may include the location of the emergency site. In some cases, only one route may be available to travel to the location of the emergency site. The only available route may be blocked by traffic or other unforeseen road conditions, increasing the emergency vehicle's response time to the emergency site. In other cases, a plurality of routes may be available to travel to the location of the emergency sites. Some of the plurality of routes may be shorter than others. However, taking the shortest route may lead to a longer response time to the emergency site than taking one of the longer routes due to traffic conditions or other unforeseen road conditions.

SUMMARY

According to an exemplary embodiment of the present invention, a method for guiding an emergency vehicle to an emergency site includes receiving an emergency dispatch message including a location of an emergency. Present location information is received for an emergency vehicle. A route between the received present location and the received location of the emergency is calculated using area map data. Navigation guidance is provided to the emergency vehicle based on the calculated route. The calculated route and the present location information for the emergency vehicle are transmitted to an unmanned aerial vehicle (UAV). The UAV is automatically piloted ahead of the emergency vehicle, along the calculated route, using the calculated route and present location transmitted thereto. A traffic alert is transmitted from the UAV to influence traffic flow ahead of the emergency vehicle.

According to an exemplary embodiment of the present invention, a method for guiding a vehicle to a destination includes receiving a destination location. A present location of the vehicle is received. A route between the present location of the vehicle and the destination is calculated. Navigation guidance is provided to a driver of the vehicle based on the calculated route. The calculated route and the present location is transmitted to an UAV. The UAV is automatically piloted ahead of the vehicle, along the calculated route, using the calculated route and the present location. Sensor data is obtained from the UAV. The sensor data is indicative of traffic conditions ahead of the vehicle, along the calculated route. The route between the present location and the destination is recalculated using the area map data and the sensor data obtained from the UAV. Updated navigation guidance is provided to the vehicle based on the recalculated route.

According to an exemplary embodiment of the present invention, a system for guiding an emergency vehicle to an emergency site includes an emergency vehicle including a global positioning system (GPS) navigation device installed therein and an UAV in communication with the GPS navigation device of the emergency vehicle. The UAV is programmed to receive navigation data, including a route, from the emergency vehicle, automatically pilot itself along the route, ahead of the emergency vehicle, obtain sensor data as it is automatically piloted, and transmit a traffic alert to influence flow of traffic along the route based on the received navigation data and the sensor data.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION

Figure 1A:
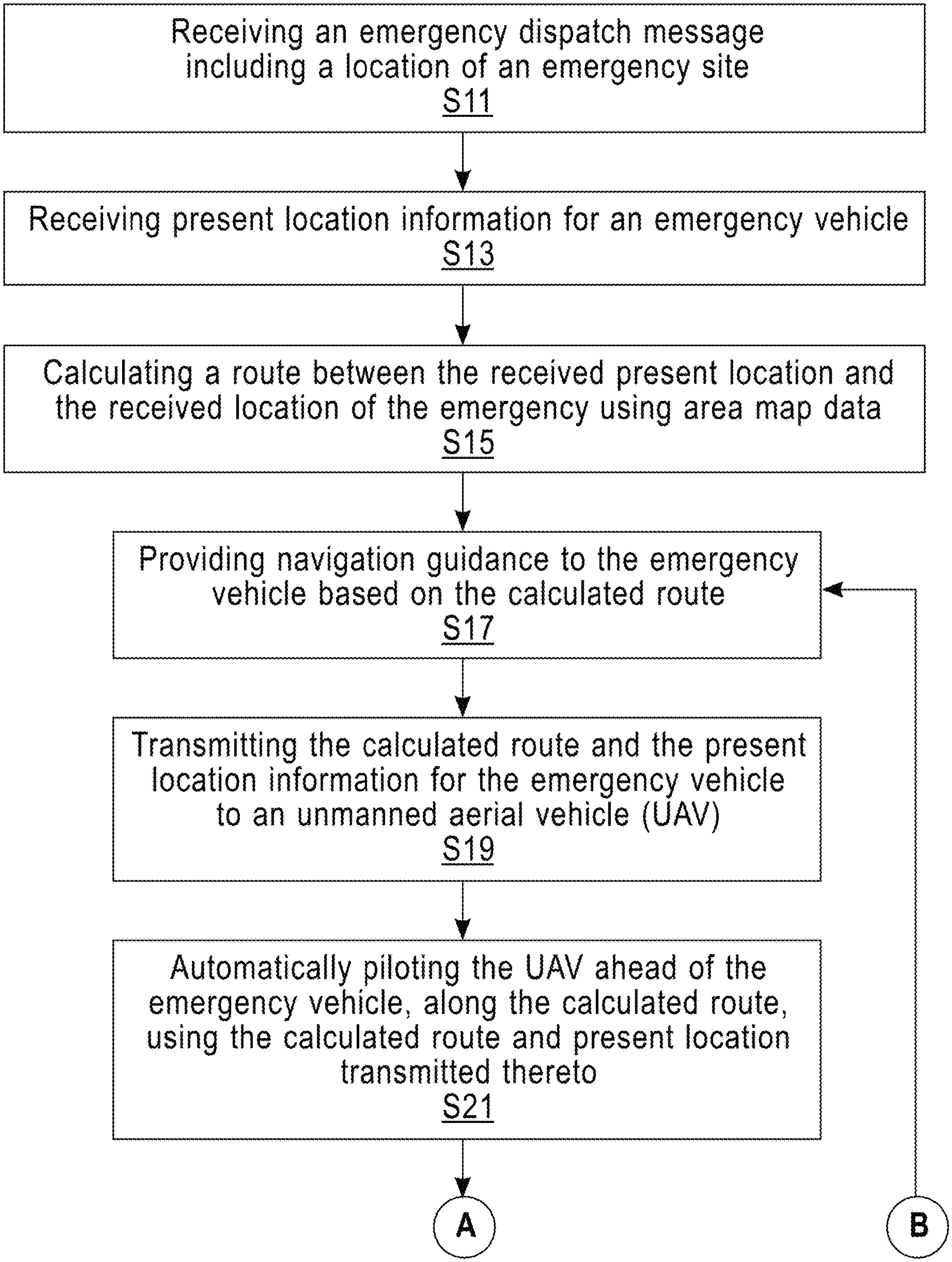
FIGS. 1A and 1B are diagrams illustrating a method for guiding an emergency vehicle to an emergency site, according to an exemplary embodiment of the present invention.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The elements illustrated in the drawings might not be drawn to scale.

In accordance with an exemplary embodiment of the present invention, a system and method can be used to calculate a fast travel path to get a vehicle, for example, an emergency vehicle, to a location of an emergency. Area map data including road layout and legal speed limits therefor may be used to calculate a travel path to the location of the emergency. The system and method may include one or more unmanned areas vehicles (UAVs) which are communicatively coupled with the vehicle. The calculated travel path may be transmitted to the one or more UAVs.

The UAVs may be automatically piloted ahead and/or around the vehicle, along the received calculated path of the vehicle, to gather traffic condition data for the road on which the emergency vehicle is currently located and for other roads in the vicinity of the emergency vehicle. The UAVs may also be manually controlled from the vehicle when needed. The one or more UAVs may also communicate with each other to transfer traffic condition data therebetween.

The one or more UAVs may provide an operator of the vehicle with real-time audio and visual data of the traffic conditions at the location of each UAV.

The traffic conditions provided by the one or more UAVs may be used to recalculate a faster travel path to the location of the emergency. Consequently, the recalculated travel path may be transmitted to the one or more UAVs. Each of the one or more UAVs may automatically or manually travel ahead of the emergency vehicle to blast a siren, to speak in a computerized voice, and/or to project visual images of traffic directions to the drivers and/or pedestrians on the road to get them off the road or to simply make them open up a travel lane for the emergency vehicle to pass. Accordingly, the travel time to the location of the emergency can be reduced.

In addition, the system and method, according to an exemplary embodiment of the present invention, can be used to learn which actions, e.g., siren sounds, computerized voice direction, volume of the sirens and voice directions, or projected visual images are most effective in getting the drivers and/or pedestrians off the road or to open up a travel lane, in a given context including a particular location, road congestion level, road type, number of travel lanes of the road, and the like. Social network input data may also be used in learning which actions are most effective. Computer learning may be used to learn, or determine, which actions are most effective.

The learned actions may be used in future emergency scenarios to reduce travel time to the location of the emergency.

Figure 1B:
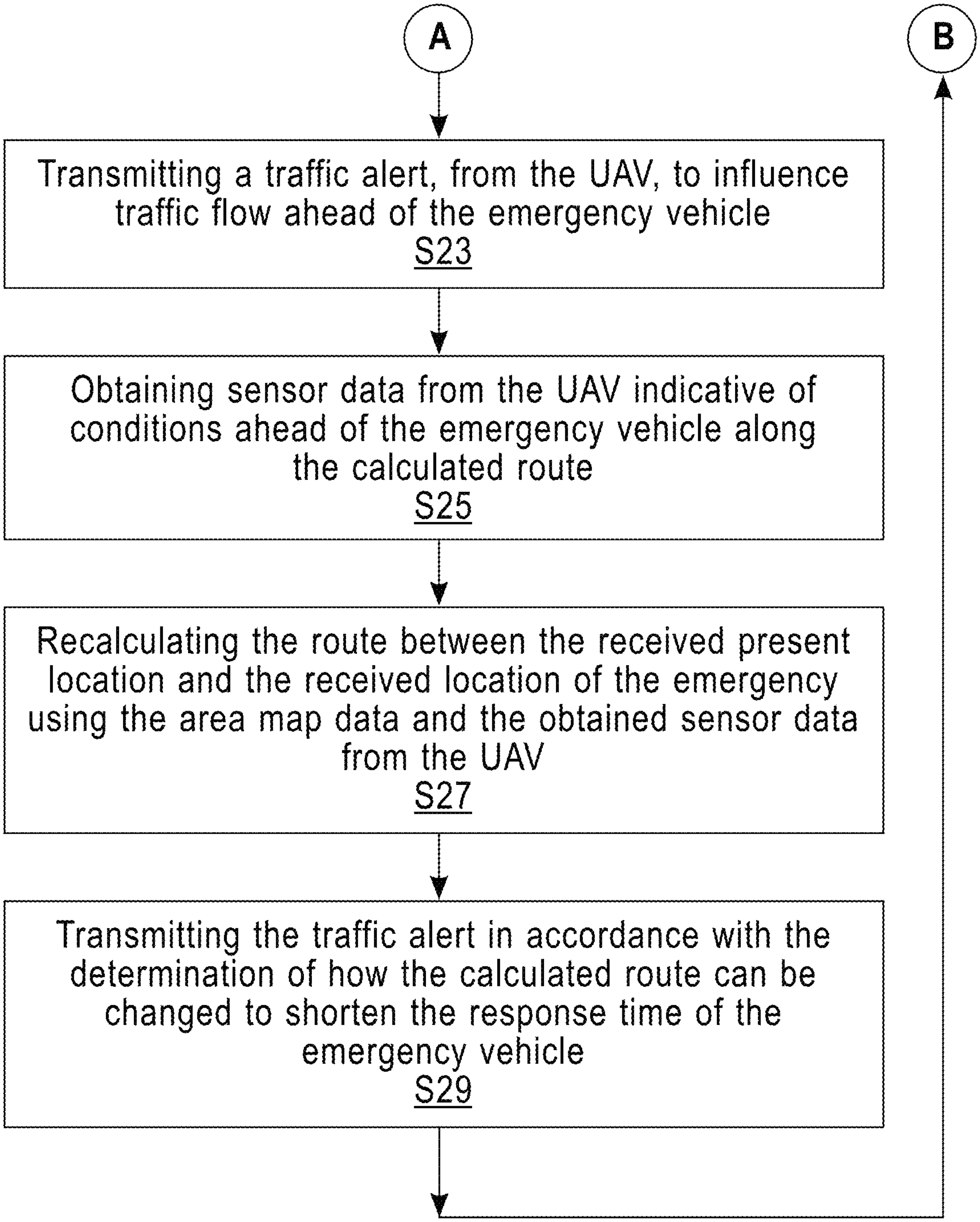

FIGS. 1A and 1B are diagrams illustrating a method for guiding an emergency vehicle to an emergency site, according to an exemplary embodiment of the present invention.

Referring to FIGS. 1A and 1B, operation S11 includes receiving an emergency dispatch message including a location of an emergency site. The emergency dispatch message may be transmitted from, for example, a dispatch call center that gathers information regarding emergencies in a given location. The emergency dispatch message may be received by, for example, an operator of an emergency vehicle. The emergency message may be transmitted through, for example, BLUETOOTH, ah-hoc wi-fi, for example, a mesh network, the internet, through cellular network bands, for example, a fourth generation long term evolution (4G LTE) or other protocols, and the like. The location of the emergency site may include global positioning system (GPS) coordinates, a street address, an intersection and/or a detailed description of the physical features of the location where the emergency has occurred. In addition, the emergency dispatch message may include the type of emergency, e.g., a fire, flood, a reported crime, a vehicular accident, or the like.

Operation S13 includes receiving present location information for an emergency vehicle. The present location information for the emergency vehicle may include GPS coordinates, a street address, and/or an intersection where the emergency vehicle is currently located. A GPS device may be disposed within the emergency vehicle to obtain the GPS coordinates of the emergency vehicle.

Operation S15 includes calculating a route between the received present location of the emergency vehicle and the received location of the emergency site using area map data. The area map data may include road information, e.g., available roads and their respective alignments, road names, road types (e.g., major highway or local roads), number of travel lanes in each direction for each road, the speed limit for each road, topography data for the roads, and the like, for a predetermined area including the received location of the emergency vehicle and the location of the emergency site.

The route between the received present location of the emergency vehicle and the received location of the emergency site may be calculated to be, for example, the fastest route (e.g., shortest travel time), the shortest route, or the like, based on the received present location of the emergency vehicle, the received location of the emergency and the area map data. The selection between the fastest route, the shortest route, or the like, may be made automatically based on predetermined criteria (e.g., shortest travel time), or it may be manually selected by an emergency respondent or other user. The route between the received present location of the emergency vehicle and the received location of the emergency site may be calculated, for example, in the emergency vehicle using the GPS device of the emergency vehicle. However, the route between the received present location of the emergency vehicle and the received location of the emergency site may also be calculated by the dispatch call center and transmitted from the dispatch call center to the emergency vehicle using BLUETOOTH, ah-hoc wi-fi, for example, a mesh network, the internet, through cellular network bands, for example, 4G LTE or other protocols, and the like.

For example, one or more travel times, corresponding to different travel paths, between the received present location of the emergency vehicle and the received location of the emergency site may be determined using the area map data, the received present location of the emergency vehicle and the received location of the emergency site. The travel speed for each of the one or more travel distances may be known based on the area map data. Accordingly, the travel time to the received location of the emergency site may be determined using the following formula: travel time equals travel distance divided by travel speed.

Operation S17 includes providing navigation guidance to the emergency vehicle based on the calculated route. The navigation guidance may relate to the calculated route (e.g., the fastest route, the shortest route, or the like). The navigation guidance may include turn-by-turn travel directions (e.g., turn left at the next intersection, keep right at the fork two miles down the road, and the like) to get the emergency vehicle to the location of the emergency site. In addition, the navigation guidance may be superimposed on a display device of the emergency vehicle. Further, the display device may illustrate area map data for a predetermined area around the emergency vehicle and real-time data of the location of the emergency vehicle on the area map data. The real-time data of the location of the emergency vehicle may be obtained from the GPS device disposed within the emergency vehicle.

Operation S19 includes transmitting the calculated route and the present location information for the emergency vehicle to an unmanned aerial vehicle (UAV). The UAV may be, for example, a quadcopter, a helicopter, an airplane, or the like. The UAV may be remotely controlled to fly and/or perform operations, or the UAV may be configured to fly and/or perform operations automatically. However, the automatic operation of the UAV may be overridden by remote controls of a user.

In operation S19, the transmission of the calculated route and the present location information of the emergency vehicle to the UAV may be performed, for example, over a point-to-point wireless connection between the UAV and the emergency vehicle, over a cellular modem disposed within the UAV, or the like.

Operation S21 includes automatically piloting the UAV ahead of the emergency vehicle, along the calculated route, using the calculated route and present location transmitted thereto. For example, the UAV may be automatically piloted to maintain a predetermined distance ahead of the emergency vehicle along the calculated route, and a predetermined distance with respect to the ground. In addition, the UAV may be automatically piloted to travel ahead of the emergency vehicle, past the predetermined distance, and back to the maintain predetermined distance.

The automatic piloting of the UAV may be based on GPS coordinates of the emergency vehicle. For example, The UAV may receive GPS data from the emergency vehicle regarding the GPS position of the emergency vehicle.

Operation S23 includes transmitting a traffic alert, from the UAV, to influence traffic flow ahead of the emergency vehicle. Operation S23 may be performed, for example, while the UAV is piloted ahead of the emergency vehicle. In addition, operation S23 may be performed, for example, while the UAV is docked to a lamppost, traffic light, or road sign. When the UAV is docked to a lamppost, traffic light, or road sign, the UAV may interface with (e.g., be electrically connected to) the lamppost, traffic sign, or road sign while it is docked to exchange data or power therebetween. For example, the lamppost, traffic light, or road sign may be specially designed to include a dock which the UAV may be docked to. Transmitting the traffic alert from the UAV to influence traffic flow includes may use machine learning to determine a set of most effective alerts to issue based on sounds and images observed by the UAV, and then issuing the determined most effective alerts. Using machine learning to determine a set of most effective alerts to issue based on sounds and images observed by the UAV is performed as a function of UAV altitude as monitored by the UAV.

The traffic alert may include displaying a visual signal from the UAV, producing an audible signal from the UAV, traffic signal preemption commands, etc. The traffic alert may be used to reduce traffic congestion or to open a travel path along the calculated route, ahead of the emergency vehicle, to reduce the emergency vehicle's travel time to the location of the emergency.

The visual signal may be projected by the UAV, for example, onto the road, a car's dashboard or hood, an advertisement or other structure visible to drivers and pedestrians, and the like. The visual signal may include written instructions directed towards drivers along the route. The written instructions may include text or symbols which instruct the drivers to, for example, clear the road, to move onto the shoulder or berm, or the like, to open a travel path for the emergency vehicle on the road. In addition, the text or symbols included in the written instructions may be used to alert the drivers and pedestrians that an emergency has occurred.

In addition, the UAV may flash lights of different colors to the drivers and/or pedestrians. The lights of different colors may be similar to those used by emergency vehicles, for example, flashing red, blue, yellow and/or white lights, or the like. The brightness of the flashing lights may be high enough such that the drivers and/or pedestrians may see the flashing lights in a sunny day.

The audible signal produced from the UAV may include a siren or spoken instructions directed towards drivers along the route. The audible signal may be directed to a specific location, or it may be spread over a predetermined angular span with respect to the UAV. The siren and spoken instructions may be emitted at a high volume to be heard from drivers who may be distracted, tired, sleeping, listening to loud music, or the like. The siren may include a sound of different and/or alternating frequencies, for example, a sound similar to a sound made by a siren of a police car, ambulance, or other emergency vehicle. Accordingly, the siren may be an alarm signal. The spoken instructions may include a computerized human voice instructing the drivers, for example, to clear the road, to move onto the shoulder or berm, or the like, to open a travel path for the emergency vehicle on the road. A spoken instruction may be, for example, "follow me", requesting that one or more drivers and/or pedestrians follow the UAV. The spoken instructions may be used to clear the road or to lead the drivers and/or passengers to a safe location. In addition, the spoken instructions may be used to alert the drivers and pedestrians that an emergency has occurred.

The traffic signal preemption commands may be transmitted from the UAV to a traffic control center, for example, wirelessly, or by wire when the UAV is docked to a lamppost, traffic light, or road sign. The traffic signal preemption commands may be used to change the flow of traffic along the calculated route, ahead of the emergency vehicle, for example, by changing the timing of traffic lights along the calculated route. For example, due to the traffic signal preemption commands, the amount of green light time at one or more traffic lights along the calculated route may be extended and the red light time may be reduced to alleviate traffic congestions, to open a travel path or to reduce the number of cars on the road along the calculated route ahead of the emergency vehicle. Accordingly, a response time (e.g., travel time) of the emergency vehicle to the emergency site may be reduced.

In addition, the UAV, when docked to a lamppost, traffic light, or road sign, may be electrically connected to the lamppost, traffic light, or road sign to directly control the traffic lights.

According to an exemplary embodiment of the present invention, the method of FIGS. 1A and 1B further includes obtaining sensor data from the UAV in operation S25. The sensor data may be obtained while the UAV is, for example, automatically or manually piloted ahead of the emergency vehicle. In addition, the sensor data may be obtained while the UAV is, for example, docked to a lamppost, traffic signal, or road sign. The sensor data is indicative of conditions ahead of the emergency vehicle along the calculated route.

The sensor data may include still image data, video data, and/or sound data of conditions ahead of the emergency vehicle along the calculated route. The conditions ahead of the emergency vehicle along the calculated route may be traffic conditions. For example, the traffic conditions may include free-flowing traffic, slow-moving and/or congested traffic, a congested or a free-flowing intersection ahead, drivers honking the horn, and the like.

The sensor data may be transmitted from the UAV to the emergency vehicle. Accordingly, a user of the emergency vehicle may see and hear the conditions ahead of the emergency vehicle along the calculated route.

In addition, the sensor data may indicate the presence of a partial or full traffic obstruction along the calculated route. The traffic obstruction may be, for example, a car accident partially or fully blocking the road, a fallen tree or pole partially or fully blocking the road, a dead animal lying on the road and partially or fully blocking the road, an open draw-bridge, or the like.

In addition, in operation S25 the sensor data obtained from the UAV may be indicative of conditions ahead of the emergency vehicle along other routes (e.g., not the route which the emergency vehicle is currently taking). The other routes may include other roads that may be located, for example, in the vicinity of the calculated route. This may be done by manually or automatically piloting the UAV into a high elevation with respect to the emergency vehicle (e.g., to get a broader viewpoint) or by manually or automatically piloting the UAV on the other roads, ahead of the emergency vehicle. For example, the UAV may automatically pilot itself around the emergency vehicle at a predetermined height and/or radial distance from the emergency vehicle. Accordingly, a user of the emergency vehicle may see and hear the conditions ahead of the emergency vehicle along the other roads. In addition, the sensor data may include partial or full traffic obstructions along the other roads.

Operation S27 may include recalculating the route between the received present location of the emergency vehicle and the received location of the emergency site using the area map data and the obtained sensor data from the UAV. The recalculated route may be for example, the travel path which would take the least amount of time (e.g., fastest time path) to get the emergency vehicle from its present location to the location of the emergency site. The recalculated route may consider the area map data and the obtained sensor data from the UAV.

The obtained sensor data may be used in calculating a travel path, e.g., the fastest time path, to the location of the emergency site by considering the current traffic conditions of the road in which the emergency vehicle is presently located and the traffic conditions on the other roads located in the vicinity of the emergency vehicle. Further, the full or partial traffic obstructions of the road in which the emergency vehicle is presently located and in the other roads in the vicinity of emergency vehicle may be included in determining the fastest time path. Accordingly, traffic conditions such as the number of cars on the roads, the speed in which the cars are traveling on the roads, the delay caused by the full or partial traffic obstructions on the roads (e.g., "roads" includes the road in which the emergency vehicle is currently located and other roads in the vicinity thereof), and the like, may be considered in determining the fastest travel path. According to an exemplary embodiment of the present invention, in determining the fastest travel path, the full or partial traffic obstructions are circumvented. For example, a different path that avoids the obstruction may be selected.

Operation S29 may include transmitting the traffic alert in accordance with the determination of how the calculated route can be changed to shorten the response time of the emergency vehicle. Operation 29 may be similar operation S23. Accordingly, a repeated description thereof is omitted for brevity.

According to an exemplary embodiment of the present invention, after performing operation S29, the method of FIGS. 1A and 1B may loop to operation S17 to provide navigation guidance to the emergency vehicle based on the recalculated route.

According to an exemplary embodiment of the present invention, the method of FIGS. 1A and 1B may include a plurality of emergency vehicles and a plurality of UAVs. Each of the plurality of UAVs may network with each of the plurality of emergency vehicles to exchange sensor data or traffic alerts. For example, a first UAV of the plurality of UAVs may be used to perform operation S25, and consequently, operation S27. Then, a second UAV of the plurality of UAVS may be used to re-perform operations S25 and S27 using the sensor data obtained from the second UAV. In addition, the second UAV may be used to perform operation S23, after re-performing operations S25 and S27. Further, the sensor data obtained from the second UAV may be transmitted to the first UAV, and the first UAV may perform operation S23.

According to an exemplary embodiment of the present invention, in operation S27, the recalculating of the route includes determining how the calculated route can be changed to shorten a response time of the emergency vehicle to the location of the emergency by altering the route and changing traffic conditions along the altered route. The recalculating of the route in operation S27 may further include determining how the calculated route can be changed to shorten the response time of the emergency vehicle. In this case, the traffic alert transmission may be performed for the route that corresponds to the shortened response time.

The altering of the route in operation S27 may be performed as described above to select a route (e.g., a new route which may be the fastest route, or to maintain the same calculated route if the calculated route is the fastest route) to get the emergency vehicle to the received location of the emergency. Thus, a repetitive description thereof will be omitted for brevity.

In this case, changing traffic conditions along the altered route may be considered in determining how the calculated route can be changed to shorten the response time of the emergency vehicle. The changing traffic conditions may include, for example, traffic (e.g., vehicular and/or pedestrian traffic) reduction along the plurality of roads located in the vicinity of the road on which the emergency vehicle is currently located.

The changes to the traffic conditions may include traffic reduction in response to a traffic alert, from the UAV, to influence traffic flow ahead of the emergency vehicle on the plurality of roads in the vicinity of the emergency vehicle, including the road on which the emergency vehicle is located. The transmission of the traffic alert has been described above with reference to operation S23. However, in this case, the changes to the traffic conditions include calculating how much the travel time to the location of the emergency vehicle may be reduced by considering the effects of the transmission of the traffic alert on the roads. For example, a total travel time to the location of the emergency may include determining a travel time given the current traffic conditions minus an estimated travel time reduced by the influence of the transmitted traffic alert.

For example, the traffic alert may include, as stated above, audible and/or visual directions instructing drivers and/or pedestrians to open a travel path for the emergency vehicle by clearing the road, moving onto the shoulder or berm, or the like. The estimated travel time reduced by the influence of the transmitted traffic alert may include determining how the drivers and/or pedestrians may respond to the traffic alert given their location and traffic conditions surrounding them, and how much travel time may be saved by the drivers' and/or pedestrians' response to the traffic alert.

For example, on Road X, two travel lanes and a wide shoulder are available in the direction in which the emergency vehicle is headed. According to the sensor data obtained from the UAV or from other sources, the current traffic conditions on Road X are congested, 15 mile-per-hour-moving-traffic. To cross Road X, which is 15 miles long, will take 1 hour given the current traffic conditions. However, it may be calculated that the transmission of the traffic alert by the UAV to the drivers along Road X may cause the drivers to move onto the shoulder of Road X, and clearing, for example, the leftmost lane of Road X. Thus, the emergency vehicle may travel through Road X at, for example, 30 miles per hour. Thus, the emergency vehicle may travel through Road X in 30 minutes due to the transmission of the alert from the UAV. It is understood that the foregoing is merely an example of how calculating how a route can be changed to shorten the response time of the emergency vehicle.

According to an exemplary embodiment of the present invention, the determining of how the calculated route can be changed to shorten the response time of the emergency vehicle may be performed using computer learning.

For example, the UAV may learn through history as to what kinds of audible and/or visual signals projected to the drivers and/or pedestrians cause the greatest shortening of the response time of the emergency vehicle (e.g., divert drivers off the road the quickest, free up clogged intersections the quickest, and the like) given the current traffic conditions and the history of past audible and/or visual signals projected to the drivers and/or pedestrians and the reaction of the drivers and/or pedestrians to the past audible and/or visual signals.

According to an exemplary embodiment of the present invention, input from social networks, (e.g., the news, printed publications, online postings, etc.) may be used by the UAV to determine how the calculated route can be changed to shorten the response time of the emergency vehicle.

The following is an example of a pseudo code for computer learning, according to an exemplary embodiment of the present invention. The pseudo code may be a Noise Tolerant Time Varying Graph (NTT). The NTT may be an algorithm used to help reason and/or predict what will happen in the future given input data for drivers/pedestrians. For example, the NTT method may be used to predict how likely it is that a driver will pull over when requested to do so by an UAV and/or an emergency vehicle. Inputs of the NTT may be: $(y,u_i,s,t, r)$=action y, performed by driver/pedestrian $u_i$, at a situation s, at a time t. Y=action history={$(y, u, s, t, r)\}_{i,t}$, $y_{i,t}$={0,1}=either performed or not (e.g. moved or not, direction changed or not). $X^t$=N×d=attribute matrix at time t=each row $x_i$ corresponds to a user, each column an attribute d. Element $xi_j$ is the $j^{th}$ attribute value of user $v_{i}$. "" describes user specific characteristics. The user specific characteristics "" may include, for example, "drives fast", "has police record", "elderly", "baby on board", "driver with accessibility needs", "hearing impaired", etc. The user specific characteristics "" may be multivariable (e.e.g, include more than one characteristic "**". An attribute augmented network $G=(V^t, E^t, X^t, S^t, R^t,'Y^t)$, where $V_t$=set of drivers/pedestrians, $E_t$=set of links between drivers/pedestrians at a time t, St=set of situations. Movement trackin. A goal of movement tracking is to learn mapping function: f: $(G, \ldots G^{T-1},V^T,E^T, S^T, R^T)\text{->}Y^T$. In this case, f denotes a function f, for example, a mapping function. A latent action state $Z^t_i$=0,1=combination of observed action $y_i$ and a possible bias. $Z^t_i$=0,1 relates to the actions of a user after transmitting the traffic alert. For example, if the traffic alert was a siren blast to get the user off the road, $Z^t_i$=0,1 relates to whether the user actually did get off the road after the siren was blasted. The algorithm context: user's actions at time t are influenced by other users' actions at time <t, on related situation/context. User's actions may be dependent on previous actions (e.g., in a given context). Users' actions have a strong correlation. The outputs of OUTPUTS=set of predicted transformation actions=(y, % probability). Accordingly, action y and the % probability of action y of a particular user may be anticipated.

The following is an example of a pseudo code for computer learning, according to an exemplary embodiment of the present invention. The pseudo code may be a classification algorithm. The classification algorithm may be used to learn siren transformation patterns. In this case, a traffic pattern may be detected and the UAVs must do a particular action in response to the detected traffic pattern. In learning siren transformation patterns the Inputs include: a Labeled set $D_l$, an unlabled set $D_u$, a number of steps T, a number of examples per iteration S.

$t=1$; while $t<=T$, do

Train a multi-label support vector machine (SVM) classifier f based on training data $D_l$ for each instance x in $D_u$, do Predict its label vector y using the LR(loss reduction)-based prediction method $$D^*_s=\text{argmax}_{Ds}(\Sigma_{X\Sigma Ds}\Sigma_{i=1}((1-y^if_i(x))/2))$$

constrained to $y^i\varepsilon\{-1, 1\}$ (equation for Maximum loss reduction with maximal confidence)

Calculate the expected loss reduction with the most confident label vector y, $$\text{score}(x)=\Sigma_{i=1}{}^k((1-y^if_i(x))/2)$$

Sort score(x) in decreasing order for all x in $D_u$

Select a set of S examples $D^*_s$ with the largest scores (or experienced SME input), and update the training set $D_l$<-$D_l$+$D^*_s$ end for Train the multi-label learner l with $D_l$ $t=t+1$;

end while $f_i(x)$ is a SVM classifier associated with class i $x_l \ldots x_n$ data points (e.g. feature vector for context/situation x–[noisy intersection, traffic stop/go, night, high-speed car chase, etc.])

In addition, the volume and/or content of the audible signal and the content of the visual signal projected by the UAV may be changed by an operator of the emergency vehicle. For example, the emergency vehicle operator might need to project an audible signal to a particular driver instructing the driver, to, for example, mount a low curb to make space for the emergency vehicle to drive past the particular driver.

It is understood that all the actions performed by the UAV and the resultant changes in traffic behavior may be stored in, for example, the UAV or another device external to the UAV, such that computer learning may be performed as to what actions of the UAV are the most effective for which traffic condition. Accordingly, computer learning may be used to predict future actions of drivers and/or pedestrians given a current state of traffic conditions on a given road, intersection, or other travel path.

It is understood that a plurality of UAVs may be used to perform the method of FIGS. 1A and 1B. When a plurality of emergency vehicles exist, each of the plurality of UAVs may be associated with a different emergency of the plurality of emergency vehicles to perform the method of FIGS. 1A and 1B, but the plurality of UAVs may exchange sensor data and a history of past audible and/or visual signals projected to the drivers and/or pedestrians and the reaction of the drivers and/or pedestrians to the past audible and/or visual signals.

Figure 2:
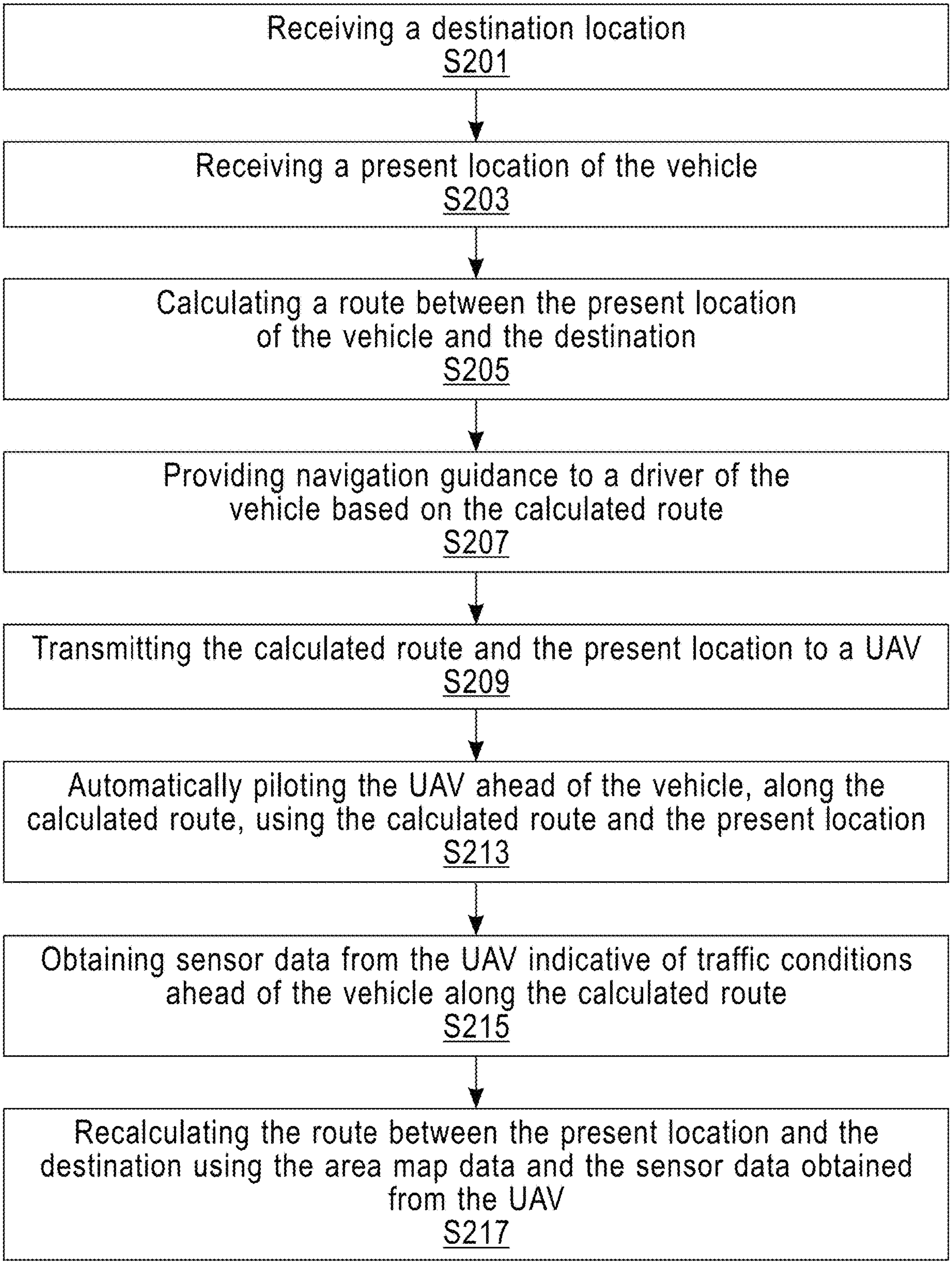
FIG. 2 is a diagram illustrating method for guiding a vehicle to a destination, according to an exemplary embodiment of the present invention.

FIG. 2 is a diagram illustrating method for guiding a vehicle to a destination, according to an exemplary embodiment of the present invention. The method of FIG. 1 may be applied to a vehicle. The vehicle may be a privately owned vehicle or an emergency vehicle. The privately owned vehicle may be, for example, a motorcycle, a car, a van, a truck, a bus, a tractor trailer, and the like.

Referring to FIG. 2, operation S201 includes receiving a destination location. For example, an operator of the vehicle may enter a desired destination location.

Operation S203 includes receiving a present location of the vehicle. The vehicle may be equipped with a GPS device. Thus, the present location of the vehicle may be automatically obtained from the GPS device in real-time, or it may be manually input by the operator of the vehicle.

Operation S205 includes calculating a route between the present location of the vehicle and the destination. This operation may be similar to operation S15 described above. For example, the area map data may be used in performing operation S205. Accordingly, a detailed description of operation S205 will be omitted for brevity.

Operation S207 includes providing navigation guidance to a driver (e.g., the operator) of the vehicle based on the calculated route. Operation S207 may be similar to operation S17 described above. Accordingly, a detailed description of operation S207 will be omitted for brevity.

Operation S209 includes transmitting the calculated route and the present location of the vehicle an UAV. Operation S209 may be similar to operation S19 described above. Accordingly, a detailed description of operation S209 will be omitted for brevity.

Operation S211 includes automatically piloting the UAV ahead of the vehicle, along the calculated route, using the calculated route and the present location. Operation S211 may be similar to operation S21 described above. Accordingly, a detailed description of operation S21 will be omitted for brevity.

Operation S213 includes obtaining sensor data from the UAV indicative of traffic conditions ahead of the vehicle along the calculated route. Operation S213 may be similar to operation S25 described above. Accordingly, a detailed description of operation S213 will be omitted for brevity.

Operation S215 includes recalculating the route between the present location and the destination using the area map data and the sensor data obtained from the UAV. Operation S215 may be similar to operations S23 and S27 described above. Accordingly, a detailed description of operation S213 will be omitted for brevity. However, in operation S215, travel time saved by transmitting a traffic alert (e.g., the siren, flashing lights, etc.) is not considered because in this case, time the UAV does not transmit a siren to influence the flow of traffic.

Operation S217 includes providing updated navigation guidance to the vehicle based on the recalculated route. Operation S217 may be similar to operation S17. For example, the recalculated route, including turn-by-turn travel directions may be provided to the operator of the vehicle. Providing updated navigation guidance to the vehicle based on the recalculated route includes transmitting the updated navigation guidance onto a dashboard of the vehicle.

A plurality of UAVs may be used according to the method of FIG. 2. For example, the plurality of UAVs may automatically be piloted in different directions with respect to the vehicle. Accordingly, sensor data from the UAVs may cover conditions ahead, to the sides, and behind the vehicle, simultaneously from each of the plurality of UAVs.

Figure 3:
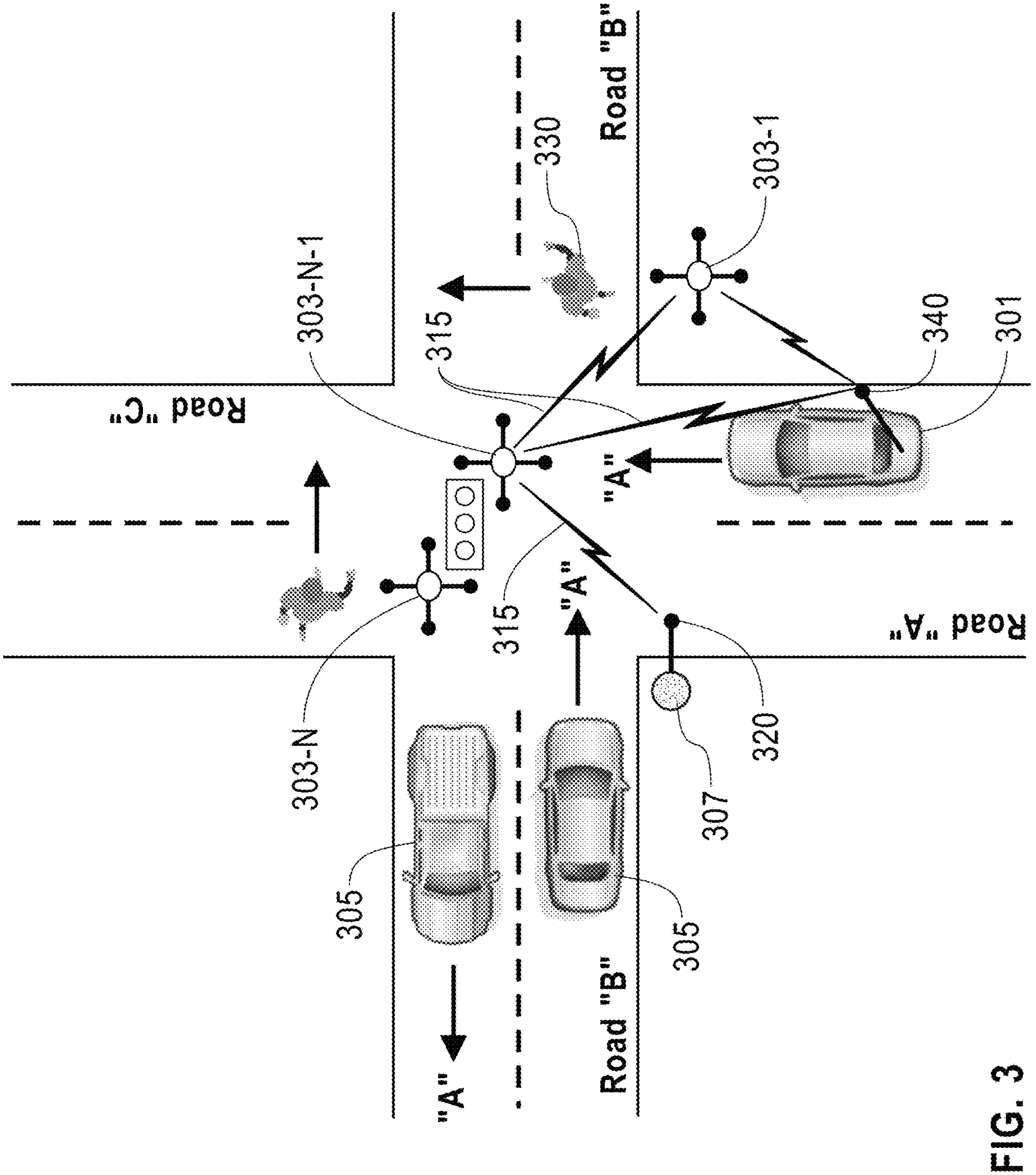
FIG. 3 is a diagram illustrating a system for guiding an emergency vehicle to an emergency site, according to an exemplary embodiment of the present invention.
Figure 4:
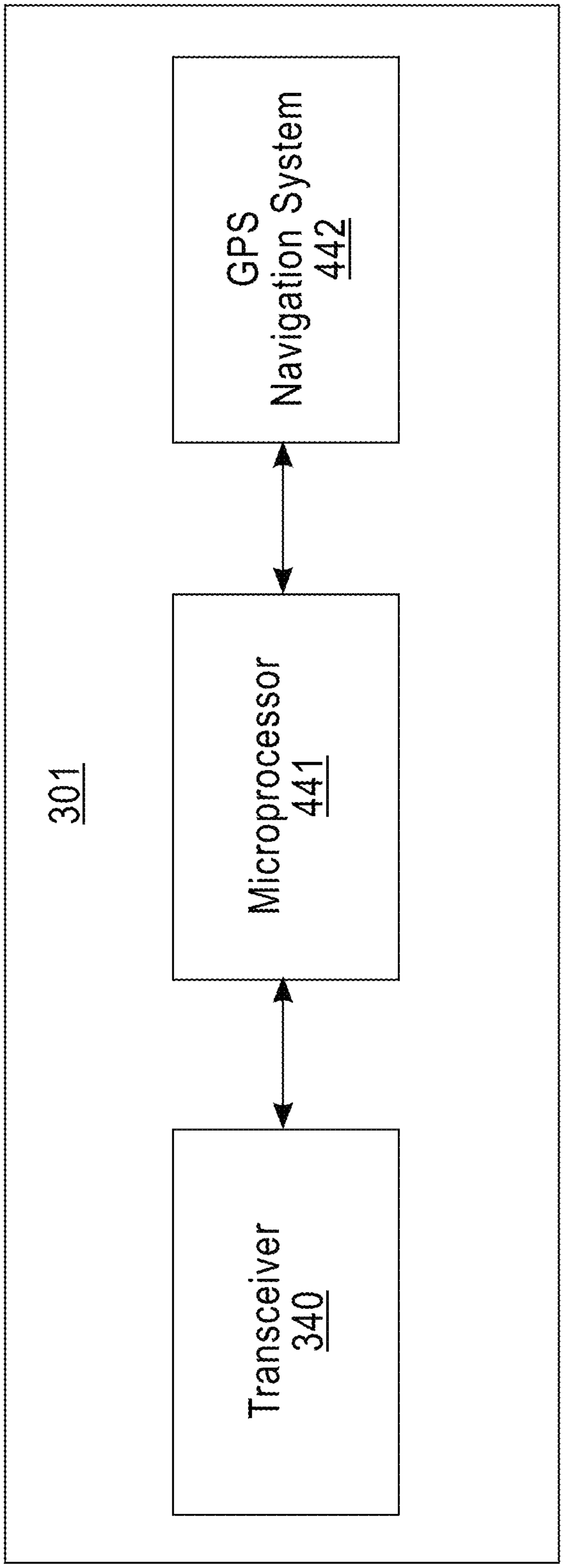
FIG. 4 is a diagram illustrating a vehicle of FIG. 3, according to an exemplary embodiment of the present invention.

FIG. 3 is a diagram illustrating a system for guiding an emergency vehicle to an emergency site, according to an exemplary embodiment of the present invention. FIG. 4 is a diagram illustrating a vehicle of FIG. 3, according to an exemplary embodiment of the present invention.

The system of FIG. 3 may perform the operations of the method of FIGS. 1A and 1B, and the operations of the method of FIG. 2.

The system of FIG. 3 may include, a vehicle 301, a plurality of other vehicles 305, a plurality of UAVs 303-1 to 303-N, a light pole 307, and a plurality of pedestrians 330.

Referring to FIG. 3, the vehicle 301 may be the emergency vehicle of the method of FIGS. 1A and 1B, or the vehicle of the method of FIG. 2. The vehicle 301 may be operated (e.g., driven) by, for example, an emergency respondent personnel. The vehicle 301 may include a transceiver 340 to be communicatively coupled with each of the plurality of UAVs 303-1 to 303-N. The light pole 307 may include a transceiver 320. The transceiver 320 may be used, for example, to receive the traffic alert submitted from the UAVs, as described in operations S23, and S29. Each of the plurality of UAVs 303-1 to 303-N may include a transceiver to communicate with each other, with the vehicle 301, and with the transceiver 320 of the light pole 307.

The transceiver 340, the transceiver 320 and the transceiver of each of the UAVs 303-1 to 303-N may be, for example, a BLUETOOTH transceiver, ah-hoc wi-fi transceiver, a cellular network band transceiver, for example, a 4G LTE transceiver or the like, etc. Thus, the vehicle 301, the light pole 307 and the UAVs 303-1 to 303-N may communicate with each other through a BLUETOOTH network, an ad-hoc wi-fi network, for example, a mesh network, or through the internet. It is understood that the above-mentioned communication methods may be wireless. However, when the UAVs 303-1 to 303-N are docked to the vehicle 301 and/or the light pole 307 through a specially designed dock included in the vehicle 301 and/or the light pole 307, the vehicle 301 and/or the light pole 307 may communicate with the UAVs 303-1 to 303-N using a wired connection through the dock.

The other vehicles 305 may be unrelated to the vehicle 301, for example, the other vehicles 305 may be a part of the existing traffic conditions on the Roads A, B and C. In FIG. 3, "A" indicates the travel direction of the vehicle 301, and the travel direction of the other vehicles 305.

Each of the UAVs 303-1 to 303-N may be a quadcopter, a helicopter, an airplane, or the like. For example, in FIG. 3 each of the UAVs 303-1 to 303-N is shown to be a quadcopter. Each of the UAVs may include a power source to fly and perform the operations of the methods of FIGS. 1A, 1B, and 2. The power source of the UAVs may include, for example, a battery (e.g., a rechargeable battery) and/or an internal combustion engine.

The UAV 303-N may be docked to a pad of the pole 307. The UAV 303-N may be electrically connected to the pole 307 through a pad of the pole 307 and may, for example, be charging its battery. In addition, the UAV 303-N may be obtaining sensor data of the traffic conditions of Roads A and B, as described in operation S25 of the method of FIGS. 1A and 1B, and operation S213 of the method of FIG. 2.

The UAVs 303-1 and 303-N-1 may be communicatively coupled with each other and with the vehicle 301. The UAV 303-N-1 may be communicatively coupled with the transceiver 320 to transmit the traffic alert to a network lights poles of nearby intersections, including the light pole 307, to influence the flow of traffic in Roads A, B, C and roads in the vicinity of Roads A, B and C by, for example, changing the sequence and timing of green lights and red lights of the pole 307 and of the poles of the nearby intersections. However, any of the UAVs 303-1 to 303-N may be used to transmit the traffic alert, as described in operations S23 and S29 of the method of FIGS. 1A and 1B.

The UAV 303-1 may be traveling, for example, in the same direction as the direction of the vehicle 301, from Road A to Road C. The UAV 303-N-1 may be traveling, for example, along Road B, in the same direction as the pedestrian 330 crossing road C. The UAVs 303-1 to 303-N may be configured to automatically maintain a minimum and/or a maximum height from the surface of the ground, and a minimum and/or a maximum radial distance from the vehicle 301.

The UAVs 303-1 to 303-N may include a loudspeaker, a projector, and flashing lights to perform operations S23, and S29 of the method of FIGS. 1A and 1B. The UAVs 303-1 to 303-N may include hardware to generate the siren, the computerized voice, the images to be projected by the projector, a light source for the projector, and hardware to control operation of the flashing lights. The UAVs 303-1 to 303-N may each include a GPS device providing real-time GPS coordinates of the UAVs 303-1 to 303-N. In addition, the UAVs 303-1 to 303-N may include a camera and a microphone to provide real-time sound and images of traffic conditions on Roads A, B and C to the vehicle 301.

The vehicle 301 may include a display device and a speaker, respectively configured to display the real-time images/video and sound and images of the traffic conditions acquired from any or all of the UAVs 303-1 to 303-N at the same time. The vehicle 301 may further include a GPS device to obtain a real-time GPS location of the vehicle 301.

Referring to FIG. 4, the vehicle 301 may include the transceiver 340 (e.g., cellular radio) to communicate with the plurality of UAVs 303-1 to 303-N, a microprocessor 441, and a GPS navigation system 442. The GPS navigation system 442 may include the display device, the speaker, and the GPS device of the vehicle 301. The area map data may be included in the GPS device of the vehicle 301. The transceiver 340 may receive wireless signals from the plurality of UAVs 303-1 to 303-N including the sensor data from each of the plurality of UAVs 303-1 to 303-N. The microprocessor 441 may process the received sensor data from the plurality of UAVs 303-1 to 303-N and the real-time GPS data from the GPS navigation system 442 (e.g., including the real-time location of the vehicle 301) to perform the operations illustrated in FIGS. 1A, 1B, and 2. The operator of the vehicle 301 may drive the vehicle 301 along the route illustrated in the display device of the GPS navigation system 442.

As shown in FIG. 3, the UAV 303-1 is wirelessly coupled to the UAV 303-N-1, and the UAV 303-N-1 is wirelessly coupled to the transceiver 320 and the vehicle 301. However, this is merely exemplary, because each of the plurality of UAVs 303-1 to UAV 303-N may be communicatively coupled to each other, to the vehicle 301, and to the transceiver 320.

It is understood that the system of FIG. 3 may include using a plurality of vehicles 301, each of which may be communicatively coupled to one or more of the plurality of UAVs 303-1 to 303-N. Since the plurality of UAVs 303-1 to 303-N may be communicatively coupled with each other, a first vehicle 301 may obtain sensor data from the UAVs 303-1 to 303-N to which it is communicatively coupled with and from the UAVs 303-1 to 303-N to which it is not communicatively coupled with (e.g., UAVs 303-1 to 303-N to which a second vehicle 301 is communicatively coupled with).

Figure 5:
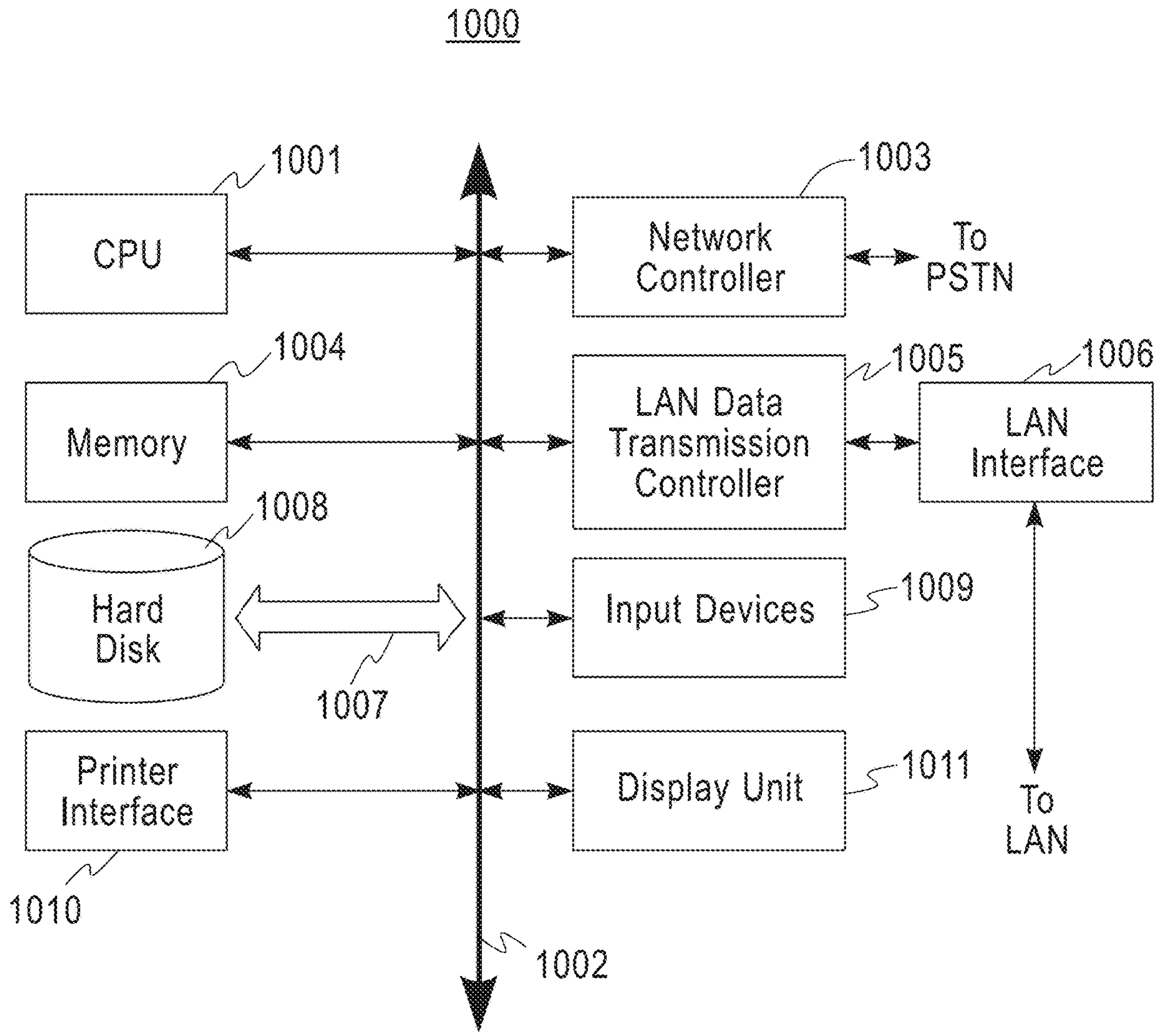
FIG. 5 shows an example of a computer system which may implement a method and system of the present invention.

FIG. 5 shows an example of a computer system which may implement a method and system of the present invention. The system and method of the present invention may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for guiding a vehicle to a destination, comprising:

receiving a destination location;

receiving a present location of the vehicle;

calculating a route between the present location of the vehicle and the destination;

providing navigation guidance to a driver of the vehicle based on the calculated route;

transmitting the calculated route and the present location to an unmanned aerial vehicle (UAV) in communication therewith;

automatically piloting the UAV ahead of the vehicle, along the calculated route of the vehicle, using the calculated route and the present location;

docking the UAV to a dock disposed along the calculated route; and exchanging data between the UAV and the dock to influence traffic flow along the calculated route of the vehicle so as to reduce a navigation time of the vehicle in communication with the UAV, wherein influencing the traffic flow comprises transmitting, from the UAV, one or more traffic alerts.

2. The method of claim 1, additionally comprising:

obtaining sensor data from one or more sensors disposed within the UAV, while the UAV is docked, indicative of traffic conditions ahead of the vehicle along the calculated route;

recalculating the route between the present location and the destination using the area map data and the sensor data obtained from the UAV; and providing updated navigation guidance to the vehicle based on the recalculated route.

3. The method of claim 1, wherein the UAV additionally charges a battery thereof while docked.

4. The method of claim 1, wherein the docking station is disposed on a lamppost, traffic light, or road sign.

5. The method of claim 4, wherein the UAV controls the lamppost, traffic light, or road sign while docked thereto.

6. The method of claim 2, wherein providing updated navigation guidance to the vehicle based on the recalculated route includes transmitting the updated navigation guidance onto a dashboard of the vehicle.

7. The method of claim 1, wherein transmitting, from the UAV, the one or more traffic alerts comprises displaying one or more visual signals from the UAV, producing one or more audible signals from the UAV, and/or issuing one or more traffic signal preemption commands.

8. The method of claim 1, wherein transmitting, from the UAV, the one or more traffic alerts to influence the traffic flow further comprises:

using one or more machine learning techniques to determine one or more traffic alerts that would be most effective to issue based on sounds and images observed by the UAV; and issuing the one or more most effective alerts.

* * * * *